United States Patent Office 3,490,648
Patented Jan. 20, 1970

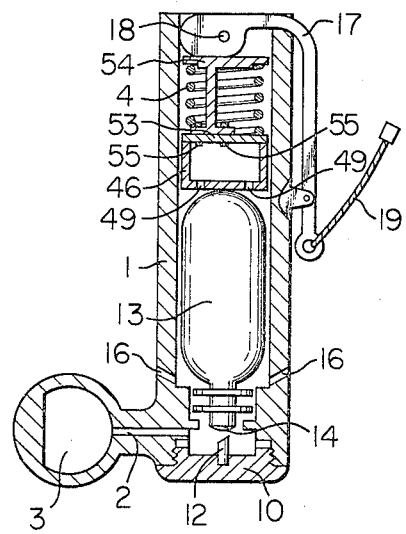
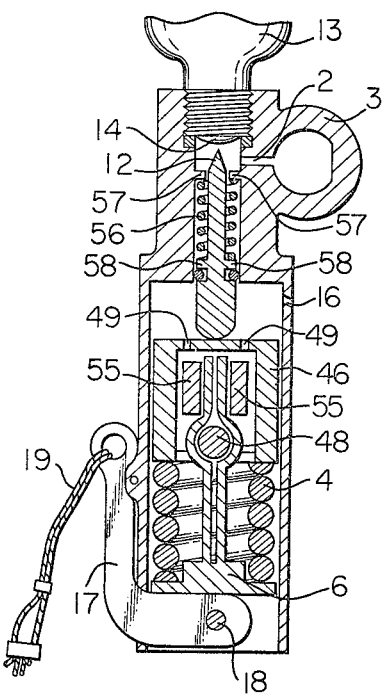
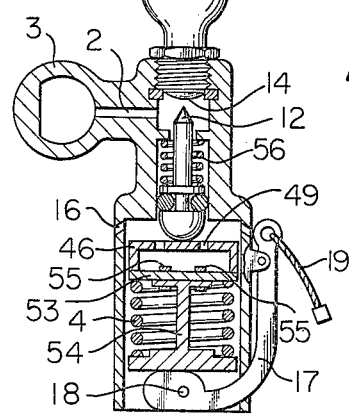
Fig. 9
Fig. 10
Fig. 11

3,490,648
AUTOMATIC GAS FILLING DEVICE OF AN INFLATABLE LIFE-SAVING EQUIPMENT
Tadao Fujimoto, 1–20 Aburatsucho, Nichinan-shi, Miyazaki-ken, Japan
Filed Dec. 5, 1967, Ser. No. 688,205
Claims priority, application Japan, Dec. 8, 1966, 41/80,764; May 17, 1967, 42/55,999; Aug. 31, 1967, 42/56,000; Oct. 24, 1967, 42/68,184; Oct. 27, 1967, 42/68,972; Nov. 1, 1967, 42/70,063, 42/70,064
Int. Cl. B67b 7/24
U.S. Cl. 222—5                    6 Claims

ABSTRACT OF THE DISCLOSURE

An improved gas filling deviced attached to an inflatable life-saving equipment characterized by introducing gas automatically from a gas cylinder of the device into a sack of the life saving equipment when the equipment is immersed in the water. The device is provided with a restricting mechanism for restricting the actuation of gas filling action of the device under dry condition while releasing the restriction when the mechanism is wetted with water.

---

Figure 1:
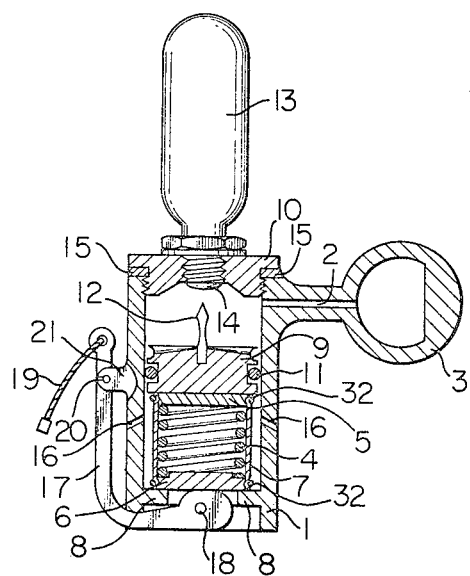

The present invention relates to an improved gas filling device used for filling gas into an inflatable life-saving equipment when required. More particularly, it relates to an improved gas filling device for use with inflatable life-saving equipment characterized by automatically introducing gas from a gas cylinder of the device into the life-saving equipment when the equipment is immersed in water.

Generally, an instantaneously inflatable life-saving equipment comprises a sack made of a flexible waterproof sheet coated with rubber or made of polyvinylchloride, a gas cylinder for containing highly compressed gas and connected to the sack by a gas conduit, a gas filling device provided with a cutter for cutting a sealing disk covering a gas outlet and an operating cord for actuating the cutter. When it becomes necessary to use the life-saving equipment, the seal cutter is actuated by pulling the operating cord by hand, the sealing disk covering the gas outlet of the gas cylinder is then broken by the seal cutter and the gas contained in the gas cylinder is introduced into the sack through the broken-gas outlet of the cylinder and a gas conduit connecting the cylinder with the sack. This kind of life-saving equipment is usually used in inflatable life rafts. When the life-saving equipment is used in a life-saving jacket, it is possible to inflate the sack of the life-saving equipment only by blowing by mouth through an air inlet of the sack.

Such conventional type life-saving equipment, however, has several substantial drawbacks due to their requirement for manufal operation such as pulling the operating cord or blowing into the sack. The life-saving equipment is usually used in case of emergency, for instance, in case a boat is overturned and the crew is thrown into the water or if a ship is wrecked and the passengers have to abondon ship. So, when the user of the equipment is seriously wounded or becomes senseless, which often happens in case of an emergency, it is quite difficult or impossible to operate the equipment manually. Moreover, when the user is a woman, a child, etc., the person may be unable to perform such a manual operation in such an emergency. In view of the above-described reasons, the conventional type of life-saving equipment sometimes cannot be utilized effectively, resulting in irretrievable loss of human lives.

The principal object of the present invention is to provide an improved gas filling device for use with inflatable life saving equipment which can automatically introduce a gas from the gas cylinder into a sack of the life-saving equipment when the equipment is immersed in water.

Another object of the present invention is to provide an improved automatic gas filling device for inflatable life-saving equipment which can easily be utilized by a woman, a child, etc.

Still another object of the present invention is to provide an improved automatic gas filling device which can be attached to conventional life-saving equipment with little modification.

Further features and advantages of the present invention will be apparent from the ensuing description, reference being made to the accompanying drawings.

Figure 2:
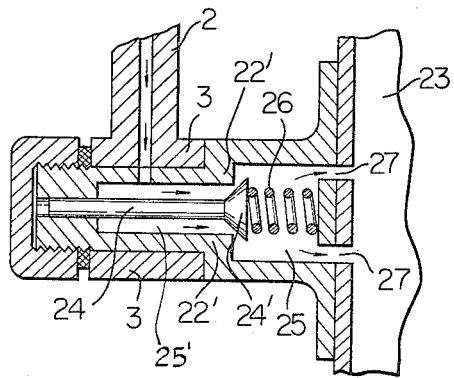
Figure 3:
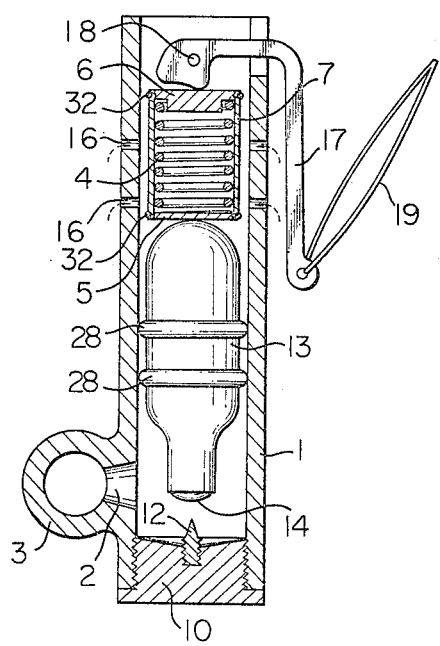
Figure 4:
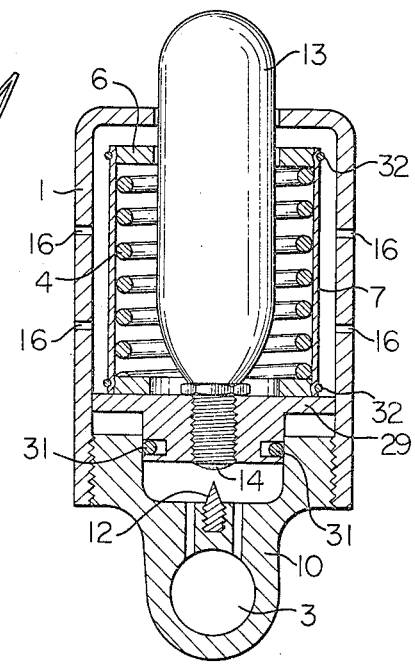
Figure 5A:
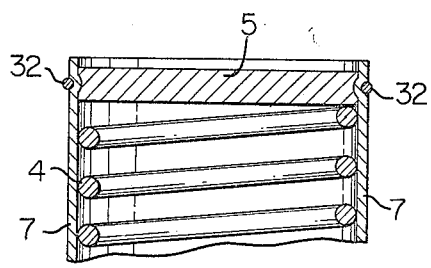
Figure 5B:
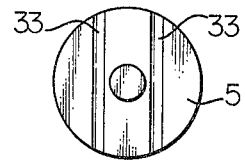
Figure 5C:
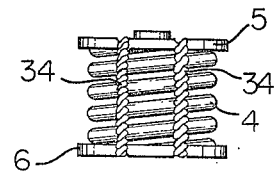
Figure 5D:
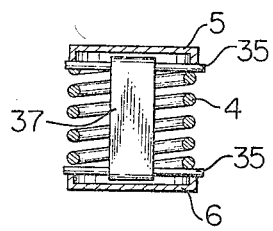
Figure 5E:
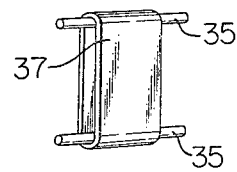
Figure 6A:
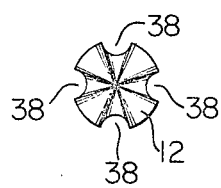
Figure 6C:
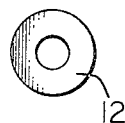
Figure 6E:
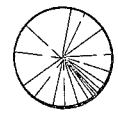
Figure 6B:
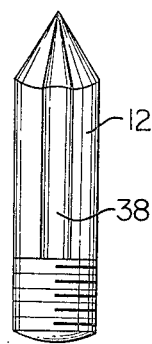
Figure 6D:
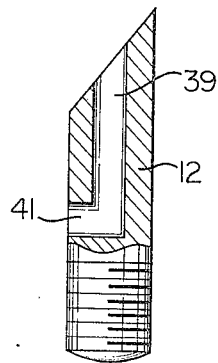
Figure 6F:
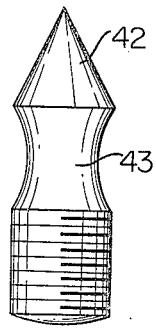
Figure 7A:
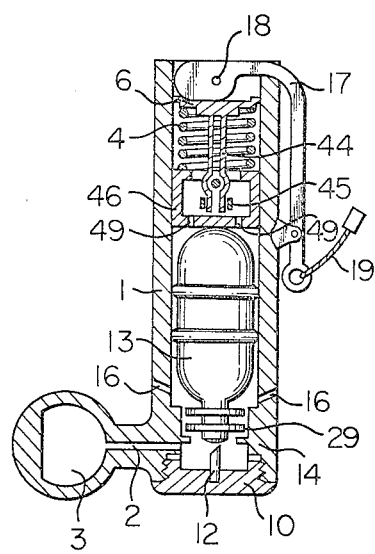
Figure 7B:
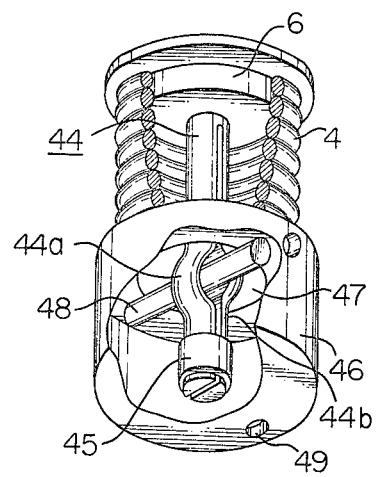
Figure 8A:
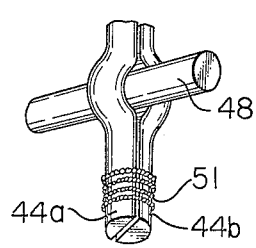
Figure 8B:
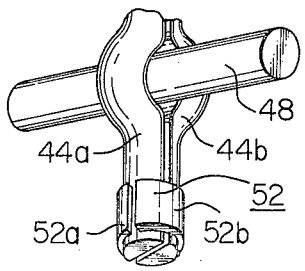

FIG. 1 is a side view, partly in section, of a gas filling device according to the present invention, FIG. 2 is an explanatory sectional side view for showing the attached condition of the gas filling device of the present invention to the sack of the life-saving equipment, FIGS. 3 and 4 are side views, partly in section, of another gas filling device according to the present invention, FIGS. 5A, 5B, 5C, 5D and 5E are explanatory drawings of various types of restricting member used for the device of the present invention, FIGS. 6A, 6B, 6C, 6D, 6E and 6F are plan and side views, partly in section, of various types of seal cutters used for the device of the present invention, FIGS. 7A and 7B are explanatory side and perspective views, partly in section and partly taken off, of still another embodiment of the gas filling device of the present invention, FIGS. 8A and 8B are enlarged perspective views for showing various types of restricting member used for the gas filling device shown in FIGS. 7A and 7B, FIGS. 9, 10 and 11 are side views, partly in section, of further embodiments of the present invention.

Generally, the inflatable life-saving equipment of the present invention comprises, a gas cylinder provided with a gas outlet covered with a sealing disk, a seal cutter, a spring for loading the gas cylinder or the seal cutter, and a restricting member for restricting the free expansion of the spring. The restricting member is made of a material which loses its strength in water. The restricting member is broken when the device is immersed in water and the seal cutter pierces the seal disk due to the free expansion of the spring. Thus the gas is automatically introduced from the gas cylinder into the life-saving equipment when the equipment is immersed in water.

Referring to FIG. 1, the main elements of an embodiment of the gas filling device of the present invention are shown. A cylindrical casing 1, is connected to a gas inlet portion (not shown) of a sack of the life-saving equipment by connecting pipes 2 and 3. A helical spring 4 is disposed within the cylindrical casing 1 in such a manner that the spring 4 is maintained in a compressed condition by a pair of spring retainers or receivers 5 and 6 which are disposed at both end portions of the spring 4. Instead of using a helical spring, it is possible to use another type of spring without departing fom the object of the present invention. The intervening distance between the pair of spring receivers 5 and 6 is defined by a cylindrical restricting member 7 surrounding the spring 4, one edge portion of which is secured to the spring receiver 5 while the other edge portion of which is secured to the spring receiver 6. The restricting member 7 is made of a material which can withstand the expanding force of the spring 4 when in a dry condition but which loses its strength and allows free expansion of the spring 4 when in a wet condition. The assemblage composed of the spring 4, spring receivers 5 and 6, and the restricting member 7 is placed within the cylindrical casing 1 and supported by an inwardly projecting flange 8 of the casing 1. A sliding member 9 is slidably disposed within the inside space of the casing 1 adjacent to the spring receiver 4. An O-ring 11 is disposed between the sliding member 9 and the inner wall of the casing 1 in order to prevent leakage of gas as later described, and a seal puncturing device or seat cutter 12 is secured to the surface of the sliding member 9 which is opposite the surface contacting the spring receiver 5 of the spring 4. A gas cylinder 13 is attached to a cover 10 of the casing 1 in such a manner that the gas outlet covered by a seal 14 faces the top end portion of the seal cutter 12 at a fixed distance. The cover 10 is screwed into the casing 1 through a packing 15 for preventing lakage of gas. The casing 1 is provided with a plurality of apertures 16 for introducing water into the casing 1 when the device is immersed in water.

In the above-described mechanical arrangement, when the life-saving equipment provided with the gas filling device of the present invention is immersed in water, water flows into the interior of the casing 1 through the apertures 16 and the above-described assemblage becomes completely wet with water. The retaining member or restricting member 7 instantly loses its strength in the water and is ruptured to allow the spring 4 to freely expand. Since displacement of the spring receiver 6 is limited by the flange 8 of the casing 1, the engaging member 5 is forced upwardly and the sliding member 9 rapidly moves toward the gas cylinder 13. When the seal cutter 12 arrives at the gas outlet of the gas cylinder 13, it breaks the seal 14 covering the outlet of the gas cylinder 13. Thus the compressed gas spouts out from the cylinder 13 and fills the sack of the life-saving equipment through the connecting pipes 2 and 3. As already described, the inside space of the casing 1 is separated into two rooms by the sliding member 9 and the O-ring 11, one room being for gas and the other being for water. The gas within the gas room does not leak into the water room, while water in the water room does not permeate into the gas room.

Auxiliary elements are also attached to the device for manual operation of the device. They are useful in case it is necessary to fill gas into the life-saving equipment before the equipment is immersed in the water. An L-shaped lever 17 is pivotably disposed eccentrically around the shaft 18, which is secured to the casing 1 at one of its end portions. The other end portion of the lever 17 is provided with an operating cord 19. The lever 17 is maintained in a stationary condition by a connecting cord 20, which is made of a substance of weak strength, connected to a knob 21 of the casing 1 in such a manner that the small diametrical end portion of the lever 17 is in contact with the spring receiver 6. When the operating cord 19 is pulled by hand against the restriction of the cord 20, the end portion of the lever 17 pivots around the supporting shaft 18. Hence the larger diametrical end portion of the lever 17 forces the entire assembly, and consequently, the sliding member 9 upwardly towards the gas cylinder 13 and the seal cutter 12 breaks the sealed gas outlet of the cylinder 13 so as to allow the gas to flow out of the cylinder 13.

The gas filling embodiment of the present device is usually attached to the life-saving equipment in a manner shown in FIG. 2, wherein the connecting pipe 3 of the gas filling device is firmly attached to an inlet device 22 of a sack 23 of the life-saving equipment. A spring biased check valve 24 is disposed within a bore 25 of the inlet device 22 in such a manner that the valve head 24' of the valve 24 is always pressed against the stepped valve seat 22' of the inlet device 22 by a spring 26 as shown in the drawing. The other end of a valve 24 is slidably inserted into the smaller diametrical portion of the bore 25.

In the above-mentioned mechanical arrangement, gas flowing from the gas cylinder 13 is conducted into the space 25 defined by the small diametrical inside wall of the inlet device 22' and the diverged valve head 24' of the valve 24. When the pressure exerted on the valve 24 due to the conducted gas overcomes the load on the valve 24 imposed by the spring 26, the valve 24 and spring 26 are displaced rightwardly, as viewed in FIG. 2 to form a slight clearance between the valve 24 and the stepped portion 22' of the inlet device 22, and gas flows into the bore 25 and then into the sack 23 through the apertures 27 as indicated by arrows in the drawing. When almost all of the gas has been transferred into the sack and the pressure on the valve 24 has accordingly been reduced, the valve head end 24' of the valve 24 is again pressed against the stepped valve seat 22' by the spring 26, and the back-flow of gas into the filling device from the sack 23 can effectively be prevented.

Another embodiment of the present invention is shown in FIGS. 3 and 4, wherein the seal cutter 12 is mounted on the cover 10 of the casing 1 and the gas cylinder 13 is slidably disposed within the casing 1 in such a manner that the sealed outlet of the gas cylinder 13 faces the top end of the seal cutter 12. In the embodiment shown in FIG. 3, the assemblage composed of the spring 4, spring receivers 5 and 6, and the restricting member 7 is placed within the cylindrical casing 1 contacting the bottom of the gas cylinder 13, and the gas cylinder 13 is slidably disposed in the casing 1 by a pair of packings 28. When the restriction on the spring 4 by the restricting member 7 is eliminated by introduction of water through apertures 16 formed through the casing 1, the spring 4 freely expands and pushes the gas cylinder 13 towards the seal cutter 12. The compressed gas contained in the gas cylinder 13 will automatically flow into the sack of the life-saving equipment in the same manner as in the embodiment shown in FIG. 1. In the present embodiment, the inside space of the device is separated into two rooms, one for gas and the other for water, by a pair of packings 28 disposed between the gas cylinder 13 and the inside wall of the casing 1. The auxiliary elements for manual operation are also attached to the device in the same manner as in the embodiment shown in FIG. 1 with the exception that the connecting cord 20 and the knob 21 are both omitted.

A modification of the embodiment shown in FIG. 3 is shown in FIG. 4, wherein the gas cylinder 13 is secured to a sliding member 29 slidably disposed within the casing 1 in such a manner that the sealed gas outlet of the gas cylinder 13 faces the seal cutter 12 secured to the cover 10 of the casing 1. The spring 4 is positioned within the casing in such a manner that it surrounds the gas cylinder 13. When the restricting member 7 is broken by immersion in water and water is introduced inside the casing 1 through the apertures 16, the freely expanded spring 4 pushes the sliding member 29 together with the gas cylinder 13 secured thereto towards the cutter 12. The sealed outlet of the gas cylinder 13 is broken by the seal cutter 12, and gas flows into the sack as in case of the preceding embodiments. An O-ring 31 is disposed between the sliding member 29 and the cover 10 in order to prevent leakage of gas or water.

Several embodiments of the assemblage for restricting the free expansion of the spring are illustrated in FIGS. 5A, 5B, 5C, 5D and 5E. In the embodiment shown in FIG. 5A, a pair of spring receivers 5 and 6 (not shown) are positioned at both ends of the spring 4, and the intervening distance between the pair of spring receivers 5 and 6 contains a restricting member 7. The cylindrical restricting member 7 surrounds the spring 4 and both rim portions of the restricting member 7 are firmly connected to the respective spring receiver 5, 6 by the respective wires 32 or the like. In the embodiment shown in FIGS. 5B and 5C, the spring receivers 5, 6 are provided with a plurality of grooves 33 formed on their surface, as shown in the drawing, and the intervening distance between the pair of spring receivers 5 and 6 contains restricting members 34. Restricting members 34 are in the form of a cord or string and are mounted in such a manner that the respective restricting members 34 pass through the respective grooves 33. In the embodiment shown in FIGS. 5D and 5E, a pair of bars 35 and 36 are placed between the spring 4 and the respective spring receivers 5 and 6. The intervening distance between the pair of bars 35 and 36 contains an endless belt-shaped restricting member 37 in such a manner that the belt passes over the bars 35 and 36 but through the inside space of the spring 4.

The restricting member used in the present invention should be made of materials which can withstand the expanding force of the spring, so as to maintain the spring in a compressed state under a dry condition, but which loses its strength and is broken by the expanding force of the spring when brought in contact with water, so as to release the restriction on the spring. As materials having such a property, papers made from paper mulberry, Manila hemp, ganpi (Wikstoemia sikokiana Franchetet Savatier) or mitsumata (Edgeworthia papyrifera Sieb et Zucc), papers containing such hydrophilic substances as polyvinylalcohol or polyethyleneglycol, etc as the binding agent, or gelatin film or starch film can be used for the restricting members of the present invention. It is also possible to use papers which do not contain hydrophilic binders but lose strength in the water.

Referring to FIGS. 6A to 6E, several embodiments of the seal cutter used in the present invention are shown. As already described, the seal cutter pierces the seal covering the outlet of the gas cylinder and breaks it when the restriction on the compressed spring is eliminated. In order to allow gas to flow out of the gas cylinder, it is necessary to form a suitable passage or clearance on the seal cutter for the gas to pass through. In the embodiment shown in FIGS. 6A and 6B, the seal cutter 12 is provided with four grooves 38 formed on the surface in the lengthwise direction and in a parallel condition with respect to the central axis of the seal cutter 12. When the cutter 12 pierces the seal 14 of the gas cylinder 13, gas spouts out of the gas cylinder through the clearance formed between the grooves 38 and the seal 14. In the embodiment shown in FIGS. 6C and 6D, the top end portion of the seal cutter 12 is obliquely cut away and a bore 39 is drilled along the lengthwise direction of the cutter 12. The bore is curved transversely towards the side surface of the cutter 12 and forms an opening 41, thereon. When the seal 14 of the gas cylinder 13 is broken by the seal cutter 12, gas spouts out of the cylinder through the bore 39 and the opening 41 of the seal cutter 12. The seal cutter 12 shown in FIGS. 6E and 6F is provided with a conical head portion 42 and a concave portion 43 below the conical head portion 42. When the cutter 12 pierces the seal 14, gas spouts out of the gas cylinder 13 through the clearance between the concave portion 43 and the seal.

Referring to FIGS. 7A and 7B, the gas filling device of the present invention is provided with different types of assemblage for restricting the free expansion of the spring from that shown in the preceding embodiments. In this embodiment, the assemblage comprises a spring 4, a spring receiver or retainer 6, a cotter pin-shaped engaging member 44, a retaining member of restricting member 45 and an inner casing 46. One erd of the cotter pin-shaped engaging member 44 is secured to the spring receiver or retainer 6 and the other end is inserted into the inner casing 46 through an aperture 47 formed through the surface of the inner casing 46. The cotter pin-shaped engaging member 44 is separated into two bifurcated end portions 44a and 44b at the portion near the spring receiver 6, and the separated two arms 44a, 44b are curved outwardly so as to form a clearance between them at the portion just inside the inner casing 46. The spring 4 is placed between the spring receiver 6 and the inner casing 46 surrounding the straight portion of the engaging member 44. The two separated bifurcated end portions or arms 44a and 44b of the engaging member 44 are bound together by a tape-like restricting member 45 so as to hold a bar 48 between the two separated arms 44a and 44b at their outwardly curved portion as shown in the drawing.

In the above-described mechanical arrangement, the spring 4 can be effectively maintained in a compressed condition between the spring receiver 6 and the inner casing 46 because of the fact that the displacement of the inner casing 46 is limited by the presence of the retaining or restricting member 45 and the locking bar 48. The restricting member 45 used in the present embodiment is made of the same substances as used for the preceding embodiments. When the life-saving equipment is immersed in water, water flows into the inner casing 46 through the apertures 16 formed through the casing 1 and apertures 49 formed through the inner casing 46, and the restricting member 45 becomes wet with water. As is apparent from the preceding description, the locking bar 48 is always pressed towards the restricting member 45 by the expanding force of the spring 4, so the respective arms 44a and 44b are always loaded in such a manner that they move away from each other at their end portions against the restriction imposed by the restricting member 45. Consequently, when the restricting member 45 has been wet with water and its strength lost, it becomes impossible for the restricting member 45 to withstand the load provided by the arms 44a and 44b and the restricting member 45 is ruptured. Then the bar 48 is driven out from between the arms 44a and 44b and the spring 4 freely expands and pushes the inner casing 46 together with the gas cylinder 13 towards the seal puncturing device or seal cutter 12. Breakage of the seal 14 by the seal cutter 12 and the introduction of the gas into the sack of the life-saving equipment are carried out in the same manner as in the preceding embodiments. The present embodiment is also provided with auxiliary elements for manual operation.

Instead of binding the end portions of the two separated arms with a tape-shaped restricting member 45, it is also possible to use a restricting member 51 in the form of a cord or string as shown in FIG. 8A or a restricting member 52 composed of a pair of molded products 52a and 52b having a semi-circular cross section as shown in FIG. 8B.

A modification of the embodiment shown in FIGS. 7A and 7B is illustrated in FIG. 9, wherein the mechanical arrangement and the combined operation of the elements are almost the same with those of the embodiment shown in FIGS. 7A and 7B with the exception that a different type of assemblage for restricting the free expansion of the spring is used. A locking bar 53 is placed between the spring and the inner casing 46 and the length of the locking bar 53 is longer than the outer diameter of the spring 4. An I-shaped engaging member 54 is disposed through the spring 4 in such a manner that a long horizontally extended portion 54a contacts one end portion of the spring 4 from outside and a short horizontally extended portion 54b is connected to the locking bar 53 by a pair of restricting members 55. The length of the long, extended portion should be longer than the outer diameter of the spring while the length of the short extended portion should be shorter than the inner diameter of the spring. The length of the vertical portion of the engaging member 54 should be designed so as to maintain the spring 4 in a compressed condition between the horizontally extended portion 54a and the locking bar 53. When wetted by water as in the case of the preceding embodiments, the restricting member 55 is ruptured or broken by the expanding force of the spring 4 and the sealed outlet 14 of the gas cylinder 13 is broken by the seal cutter 12 so as to spout gas out of the gas cylinder 13.

While in the case of the embodiments shown in FIGS. 7A, 7B and 9, the seal cutter 12 is secured to the casing 1 of the device and the gas cylinder 13 is slidably disposed within the casing 1, the gas cylinder 13 is, in the case of the embodiments shown in FIGS. 10 and 11, secured to the casing 1 and the seal cutter 12 is slidably disposed within the casing 1 as in the case of the embodiment shown in FIG. 1.

A modification of the embodiment shown in FIGS. 7A and 7B is shown in FIG. 10, wherein the seal puncturing device or seal cutter 12 is slidably inserted into a bore drilled through the cover 10 of the casing 1, and a spring 56 for maintaining the top end portion of the seal cutter 12 at a distance from the sealed outlet 14 of the gas cylinder 13 is placed between an inwardly extended flange 57 of the cover 10 and the flanged portion 58 of the seal cutter 12. When the restriction of the spring 4 is eliminated by wetting with water, the seal cutter 12 is pushed towards the sealed outlet 14 by the expanding force of the spring 4 overcoming the expanding force by the spring 56, resulting in the introduction of gas from the gas cylinder 13 into the sack of the life-saving equipment.

A modification of the embodiment shown in FIG. 9 is illustrated in FIG. 11, wherein the gas cylinder 13 is secured to the casing 1 and the seal cutter 12 is slidably disposed within the cover 10 of the casing 1 in the same manner as in case of the embodiment shown in FIG. 10, and the combined operation of the elements is quite similar to that explained with respect to the embodiment shown in FIGS. 9 and 10.

While the invention has been described in conjunction with certain embodiments thereof, it is to be understood that various modifications and changes may be made without departing from the spirit and scope of the invention.

What is claimed is:

1. An improved inflator device for automatically releasing gas from a storage container upon immersion in water comprising; a casing having a plurality of apertures formed in a peripheral wall thereof, a gas storage container having a gas outlet covered by a puncturable seal, a seal puncturing device positioned in said outer casing opposite from and a predetermined distance from said seal of said gas outlet, said seal puncturing device and said gas storage container being positioned for relative movement with respect to each other, spring means disposed within said outer casing, a spring retainer disposed in said casing and in contact with one end of said spring means, an inner casing slidably disposed within said outer casing and having plural openings formed therein, said inner casing being positioned at the other end of said spring means, a cotter pin-shaped member extending from said spring retainer through said spring means and having bifurated end portions projecting through one of said inner casing openings, a locking bar within said inner casing and extending transversely between said bifurcated end portions, said locking bar having a locking position locking said inner casing in a position compressing said spring means and operable to an unlocking position wherein said inner casing is allowed to move in response to force exerted thereon by said compressed spring means, and retaining means reactive to water retaining said bifurcated end portions in a closed position while in a dry condition and thereby retaining said locking bar in its locking position and allowing rapid lateral opening of said bifurcated end portions when immersed in water whereby said locking bar is rapidly moved to its unlocking position.

2. An improved inflator device according to claim 1, wherein said gas storage container is slidably disposed within said outer casing and said seal puncturing device is secured to a closed end of said outer casing, whereby upon immersing the device in water, said retaining means is ruptured, said locking bar is rapidly moved to its unlocking position, and said inner casing forces said gas storage container against said seal puncturing device to puncture said seal.

3. An improved inflator device according to claim 1, wherein said gas storage container is secured to one end of said outer casing and said seal puncturing device is slidably disposed within said outer casing, whereby upon immersing the device in water, said retaining means is ruptured, said locking bar is rapidly moved to its unlocking position, and said inner casing forces said seal puncturing device against said seal covered outlet to puncture said seal.

4. An improved inflator device according to claim 1, wherein said seal puncturing device comprises an elongated rod having a pointed seal puncturing tip and a plurality of longitudinally extending grooves to accommodate the flow of gas from said gas storage container when the puncturing device has punctured said seal.

5. An improved inflator device according to claim 1, wherein said seal puncturing device comprises an elongated rod having a pointed seal puncturing tip and a gas passageway extending longitudinally, interiorly of said rod from the tip end and opening on the surface of said rod a predetermined distance from said tip end.

6. An improved inflator device according to claim 1, wherein said seal puncturing device comprises an elongated rod having a pointed seal puncturing tip and an annular peripheral recess a predetermined axial distance from said tip end to accomodate flow of gas from said gas storage container when the puncturing device has punctured said seal.

References Cited

UNITED STATES PATENTS

| | | | |
|---|---|---|---|
| 2,675,143 | 4/1954 | Seemann | 222—5 |
| 2,684,784 | 7/1954 | Fox | 222—5 |
| 2,722,342 | 11/1955 | Fox | 222—5 |
| 3,015,414 | 1/1962 | Wilson | 222—5 |

SAMUEL F. COLEMAN, Primary Examiner